US006819500B2

United States Patent
Tsuzuki

(10) Patent No.: US 6,819,500 B2
(45) Date of Patent: Nov. 16, 2004

(54) LENS DEVICE INCLUDING ORTHOGONALLY DRIVEN BLUR COMPENSATION LENS ACTUATORS AND AXIALLY DRIVEN LENS ACTUATOR, AND OPTICAL EQUIPMENT USING SAME

(75) Inventor: Masahiko Tsuzuki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/390,921

(22) Filed: Mar. 19, 2003

(65) Prior Publication Data

US 2003/0184878 A1 Oct. 2, 2003

(30) Foreign Application Priority Data

Mar. 29, 2002 (JP) ........................................ 2002-093996

(51) Int. Cl.[7] .............................................. G02B 15/14
(52) U.S. Cl. ........................ 359/696; 359/823; 359/824
(58) Field of Search ......................... 359/694, 696–698, 359/823, 824; 396/52, 55; 348/208.11

(56) References Cited

U.S. PATENT DOCUMENTS 6,456,444 B1    9/2002   Yumiki et al. .............. 359/696
6,529,337 B2 *  3/2003   Koyama et al. ............ 359/696
2004/0057710 A1 * 3/2004   Terao ........................... 396/52

* cited by examiner

Primary Examiner—Georgia Epps
Assistant Examiner—M. Hasan
(74) Attorney, Agent, or Firm—Fitzpatrick, Cella, Harper & Scinto

(57) ABSTRACT

A lens device comprises a movable compensation lens holding member holding a blur compensation lens, two blur compensation actuators for driving the movable compensation lens holding member to move in a direction orthogonal to an optical axis of the lens device to compensate for image blur, a movable lens holding member holding a movable lens, and an axial lens driving actuator for driving the lens holding member to move in the axial direction; an optical equipment comprises an optical system including such optical elements, a light amount adjusting member and an imaging element. The axial lens driving actuator includes a magnet magnetized vertically in the direction of the optical axis, a yoke, and a coil mounted on the movable lens holding member at a predetermined distance from the magnet, where the coil is movable in the direction of the optical axis by application of current in the direction orthogonal to a magnetic flux generated by the magnet. The axial lens driving actuator is disposed at a position symmetrical to one of the two blur compensation actuators with respect to the optical axis when viewed in the direction of the optical axis.

5 Claims, 5 Drawing Sheets

LENS DEVICE INCLUDING ORTHOGONALLY DRIVEN BLUR COMPENSATION LENS ACTUATORS AND AXIALLY DRIVEN LENS ACTUATOR, AND OPTICAL EQUIPMENT USING SAME

BACKGROUND OF THE INVENTION

1. Field of the Invention

The present invention relates to a lens device and optical equipment using the same, such as a video camera or a digital still camera.

2. Description of the Related Art

It is known to prevent image blur due to handshake that tends to occur during a hand-held photo-taking operation using an image blur compensation unit, where the image blur compensation unit detects the state of blurring of a camera with a blur detecting unit and shifts a compensation lens in a direction orthogonal to the optical axis in accordance with the detected results.

In a camera provided with such an image blur compensation unit, displacement of an imaging position due to shake (blurring) is compensated for by movably supporting a compensation lens constituting at least a part of a photo-taking lens system and moving the compensation lens in a direction within a plane orthogonal to the optical axis of the main optical system so as to compensate for the shake (image blur).

In such an image blur compensation unit, an electromagnetic actuator is constructed of a coil and a magnet. One of the coil and the magnet is attached to a fixed portion (e.g., a fixed lens barrel) and the other one is attached to a lens holding frame for holding the compensation lens, so that relative movement of the lens holding frame may be directly achieved. When considering downsizing and power saving of the unit, it is advantageous to attach the magnet, which is heavier in weight, to the fixed portion and to attach the coil, which is lighter in weight, to the lens holding frame. In this configuration, wiring from the fixed portion to the coil mounted on the lens holding frame may be provided by a flexible printed board.

The position of a movable lens group for zooming or focusing is adjusted by rotating a screw portion provided on an output shaft of a stepping motor, so that a lens carrier frame connected to a rack member, which moves in conjunction with the screw portion, is moved in the direction of the optical axis.

In the case of the above-described related art, a stepping motor for driving the movable lens group for zooming and focusing controls the movable lens group so as to move and stop at a predetermined position by rotating a feed screw by an angle corresponding to a predetermined number of pulses.

In order to enhance resolution of the stop position of the movable lens group, it is necessary to reduce the pitch of the feed screw of the stepping motor. On the other hand, in order to increase the speed of movement of the movable lens group, the stepping motor may be rotated at a higher speed; in order to further increase the speed, it is necessary to increase the pitch of the feed screw. Therefore, simultaneous pursuit of increase in speed and improvement in accuracy is limited.

In particular, a simultaneous pursuit of stoppage with a high-degree of accuracy and movement of a focus lens at a high-speed is required due to the recent increase in pixel count of imaging elements and an increase in zoom ratio. Hence, a system realizing simultaneous pursuit of accurate control of lens stop positions and an increase in lens speed has been proposed, wherein a linear actuator including a coil and a magnet is used for moving the focus lens instead of a conventional stepping motor.

Such a linear actuator, however, has a lower generated torque than a driving mechanism using a stepping motor. Thus, the actuator cannot be disposed at a position too remote from the center of gravity of the movable lens group. Rather, the linear actuator must be disposed near the lenses in accordance with the amount of movement of the movable lens group. Consequently, in a construction in which an image blur compensation unit that drives a compensation lens in a direction orthogonal to the optical axis using an electromagnetic actuator and a linear actuator that drives a movable lens in a direction of the optical axis are disposed in a lens barrel, the effective arrangement of those actuators is an important issue.

SUMMARY OF THE INVENTION

In one aspect, the present invention relates to a lens device in which two actuators for driving a compensation lens in a direction orthogonal to the optical axis and an actuator for driving a movable lens in a direction of the optical axis are efficiently disposed in a space of the lens device, whereby downsizing of the lens device (lens barrel) and shortening of the length of the lens device (lens barrel) in the direction of the optical axis are achieved, the range of movement of the movable lens that moves in the direction of the optical axis is efficiently increased, and detection of the position of the movable lens in the direction of the optical axis is detected with a high-degree of accuracy.

In another aspect, the present invention related to an optical equipment using the same.

The in above-described drawbacks of the related art are overcome by a lens device of the present invention, which includes:

a blur compensation lens holding frame holding a blur compensation lens;

two blur compensation actuators that drive the blur compensation lens holding frame to move in a direction orthogonal to an optical axis of the lens device;

a movable lens holding member holding a movable lens; and an axial driving actuator that drives the movable lens holding member in the direction of the optical axis;

wherein the axial driving actuator includes a magnet magnetized vertically in the direction of the optical axis, a yoke, and a coil mounted on the movable lens holding frame at a predetermined distance from the magnet and is movable in a direction of the optical axis by application of current in a direction orthogonal to a magnetic flux generated by the magnet, and wherein the driving actuator is disposed at a position symmetrical to one of the two blur compensation actuators with respect to the optical axis when viewed in the direction of the optical axis.

In the lens device described above, the two blur compensation actuators are provided at respective positions in two different directions orthogonal to the optical axis (e.g., horizontal and vertical directions).

In this manner, the two actuators for driving the compensation lens in a direction orthogonal to the optical axis and the actuator for driving the movable lens in the direction of the optical axis efficiently may be arranged in a space of the lens device, thereby reducing a size of the lens device, shortening the length of the lens device in the direction of the optical axis, and efficiently and securely increasing the range of movement of the movable lens in the direction of the optical axis.

Optical equipment of the present invention includes:
an optical system including a movable lens axially movable in the direction of the optical axis, and a blur compensation lens that compensates for image blur by moving in a direction orthogonal to the optical axis;
two compensation actuators that drive the blur compensation lens holding frame in a direction orthogonal to the optical axis;
a driving actuator for driving the moving lens holding frame in the direction of the optical axis;
a light amount adjusting member that adjusts the amount of light passing through the optical system; and
an imaging element for imaging the optical image from the optical system;
wherein the driving actuator includes a magnet magnetized vertically in the direction of the optical axis, a yoke, and a coil mounted on a member holding the movable lens at a predetermined distance from the magnet and is movable in the direction of the optical axis by application of current in the direction orthogonal to the magnetic flux generated by the magnet, and
wherein the driving actuator is disposed at a position symmetrical to one of two blur compensation actuators that drive the blur compensation lens with respect to the optical axis when viewed in the direction of the optical axis.

In the optical equipment described above, the two blur compensation actuators are provided at respective positions in two different directions orthogonal to the optical axis. In addition, in the optical equipment described above, the one blur compensation actuator and the driving actuator are disposed between the light amount adjusting member and the imaging element.

In this arrangement, the two blur compensation actuators for driving the blur compensation lens in a direction orthogonal to the optical axis and the actuator for driving the movable lens in the direction of the optical axis efficiently may be arranged in a space of the optical equipment, thereby reducing the size of the optical equipment, shortening the length of the optical equipment in the direction of the optical axis, and effectively and securely increasing the range of movement of the movable lens in the direction of the optical axis.

According to the present invention, the optical system described above may employ a rear focus zoom lens constructed of four lens groups, with a first lens group including fixed positive lenses, a second lens group including negative variable power lenses for effecting zooming by moving in the direction of the optical axis, a third lens group including positive compensation lenses that compensate for image blur by moving a part of or all of the lenses in a direction orthogonal to the optical axis, and a fourth lens group including focus lenses movable in the direction of the optical axis that compensate for variations of image surface in association with the movement of the variable power lenses (the second lens group) and perform focus adjustment. The driving actuator described above may be used to move movable lenses, such as the variable power lens and the focus lens, in the direction of the optical axis.

Further objects, features and advantages of the present invention will become apparent from the following description of the preferred embodiments with reference to the attached drawings.

DESCRIPTION OF THE PREFERRED EMBODIMENTS

Figure 1:
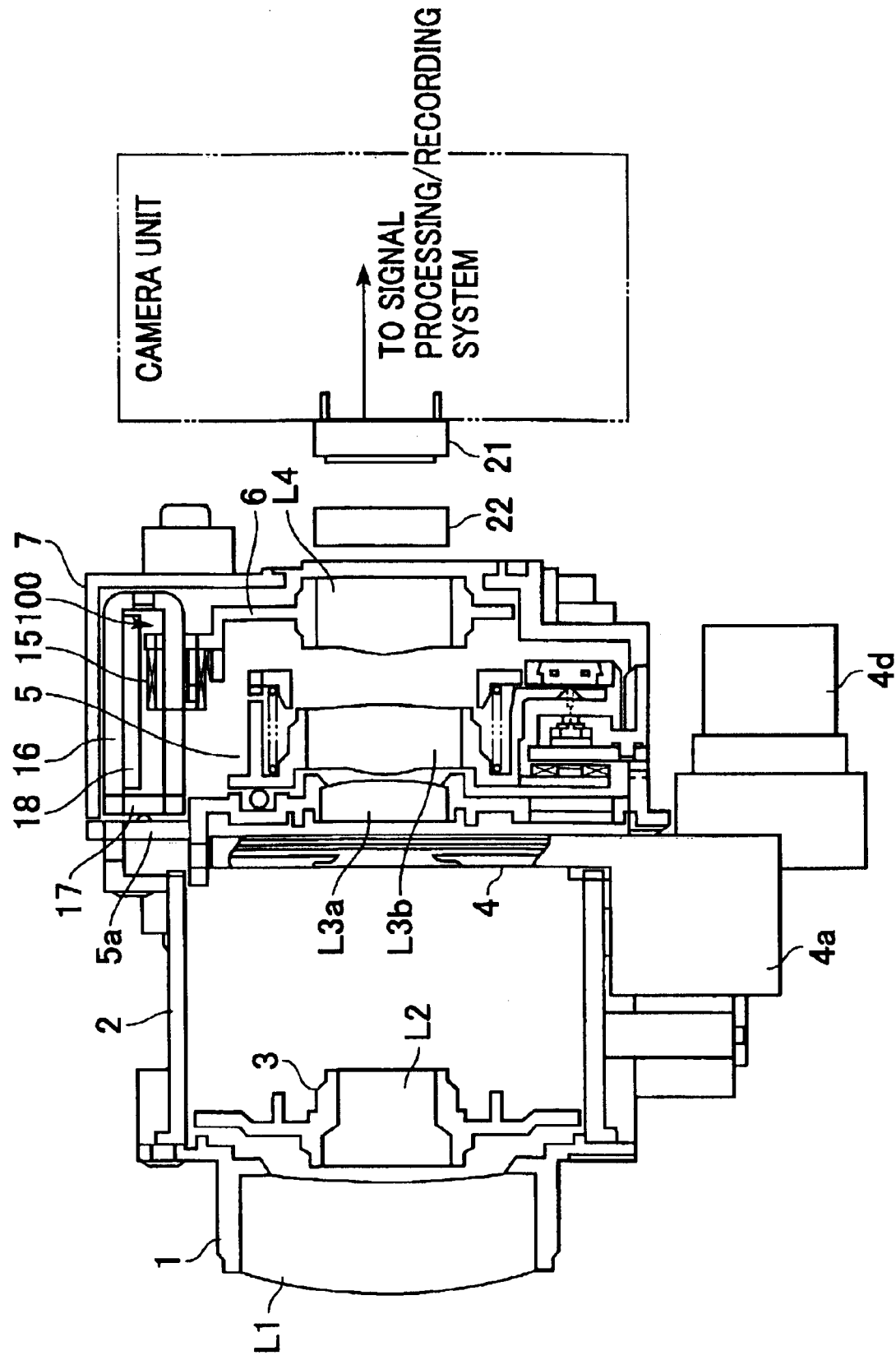
FIG. 1 is a cross sectional side view showing a construction of a zoom lens device of optical equipment according to an embodiment of the invention.
Figure 2:
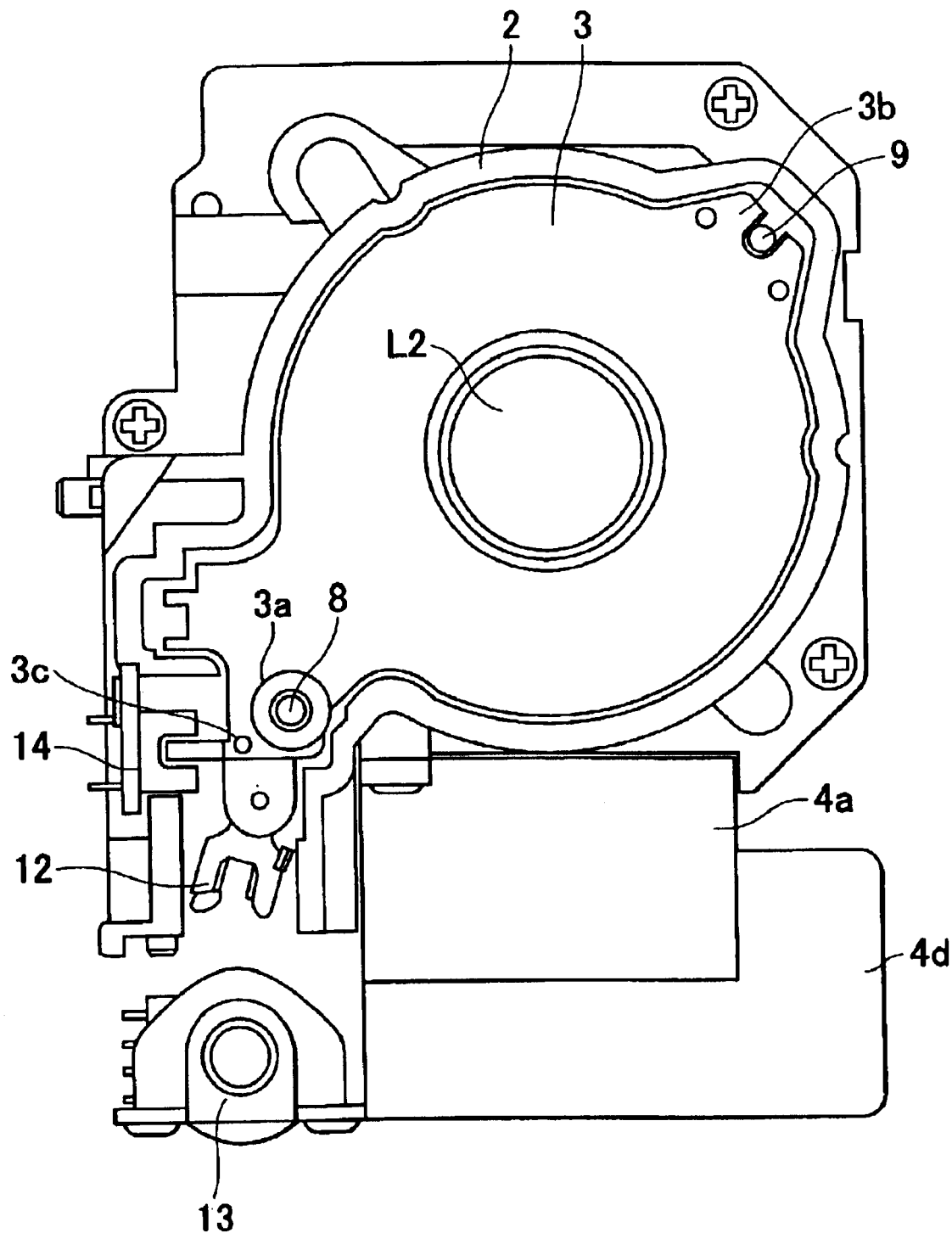
FIG. 2 is a view of the device of FIG. 1 from the object side, with the first lens group omitted.
Figure 3:
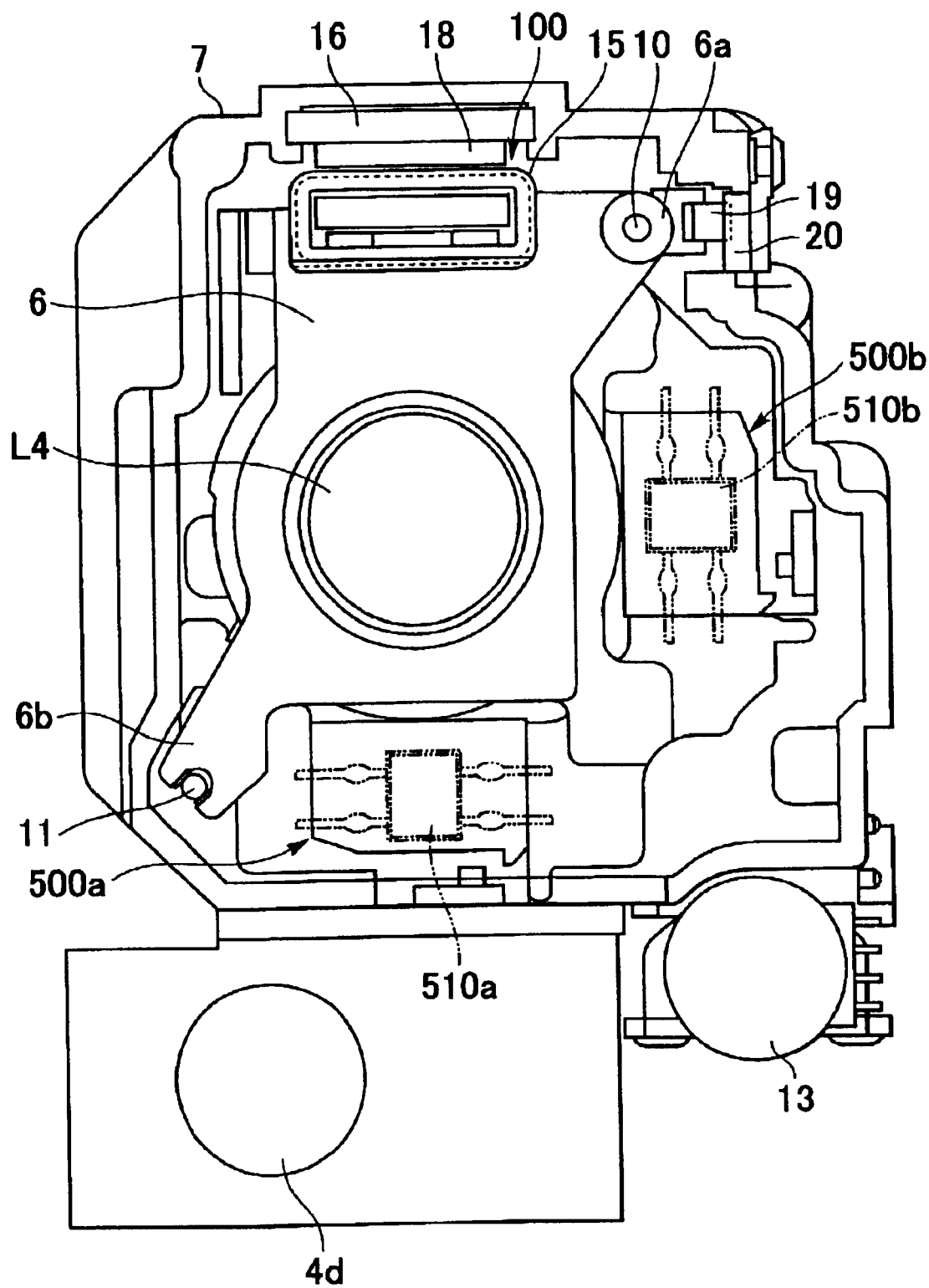
FIG. 3 is a view of the device of FIG. 1 from the image surface, with a holder barrel omitted.

FIGS. 1 to 5 illustrate one embodiment of a lens device (lens barrel) of the present invention applied to optical equipment including an imaging element, such as a video camera or a digital still camera. FIG. 1 is a cross-sectional side view showing a zoom lens barrel of optical equipment according to an embodiment of the present invention; FIG. 2 is a view of the device of FIG. 1 from the object side with the first lens group omitted; and FIG. 3 is a view of the device of FIG. 1 from the image surface side (from a CCD 21) with a holder barrel omitted.

A zoom optical system in the zoom lens barrel is a rear focus zoom optical system respectively including four groups of convex lenses, concave lenses, convex lenses and convex lenses (positive, negative, positive and positive) arranged in sequence from the object side.

In FIGS. 1 to 3, a first lens group barrel 1 holds a fixed lens group L1 belonging to the first lens group. The first lens group barrel 1 is fixed to a fixed lens barrel 2. A second lens group holding frame (holding member) 3 holds a zoom lens group L2 belonging to the second lens group accommodated in the fixed lens barrel 2. The second lens group holding frame 3 is formed with a sleeve portion 3a and a U-shaped groove portion 3b, as shown in FIG. 2. The sleeve portion 3a and the U-shaped groove portion 3b movably engage guide bars 8 and 9 provided on the fixed lens barrel 2 along the optical axis, whereby the second lens group holding frame 3 is guided by the guide bars 8 and 9 for movement substantially along the optical axis.

An aperture unit 4 includes a drive unit 4a that controls the amount of light passing through the optical system by driving an aperture blade (not shown). The amount of light also is controlled by a drive unit 4d that drives a filter frame with an ND filter adhered thereon (both not shown).

An image blur compensation unit 5 includes an afocal lens group, belonging to the third lens group, that is separated into a lens group L3a (which is fixedly held), and an image blur compensation lens group L3b (which is movable).

A fourth lens group holding frame (holding member) 6 holds a focus lens group L4, belonging to the fourth lens group, and serves as a compensator and as focusing means. The fourth lens group holding portion 6 includes a sleeve portion 6a and a U-shaped groove portion 6b, as shown in FIG. 3. The sleeve portion 6a and the U-shaped groove 6b movably engage guide bars 10 and 11 provided on a holder barrel (rear side fixed lens barrel) 7 along the optical axis, whereby the fourth lens group holding frame 6 is guided by the guide bars 10 and 11 for movement substantially along the optical axis.

As shown in FIG. 2, a rack 12 is mounted to the second lens group holding frame 3. The rack 12 meshes with an output screw portion (not shown) of a zoom motor 13 (FIG. 2 shows a state in which the zoom motor 13 and the output screw portion are separated from one another). In this case, a stepping motor is used as the zoom motor 13. When the zoom motor 13 rotates, the second lens group holding frame 3 is driven in the direction of the optical axis by the actions of the output screw portion and the rack 12.

Positional control of the movement of the second lens group holding frame 3 is performed by determining an initial position at which a light-shielding wall 3c of the second lens group holding frame 3 shields light incident on a photo interrupter 14, and thereafter by controlling the position of the lenses in the second lens group holing frame 3 by counting pulses of the stepping motor, which constitutes the zoom motor 13.

As shown in FIG. 1, the holder barrel 7 fixedly holds an imaging element (e.g., a CCD 21) and a filter 22, which cuts infrared light and functions as a low-pass filter. Image signals from the CCD 21 are supplied to a signal processing system and a signal recording system of a camera unit. The holder barrel 7 includes a boss (not shown). The holder barrel 7 positions the image blur compensation unit 5 and the fixed lens barrel 2 using the boss (not shown). A frame portion 5a of the image blur compensation unit 5 is interposed between the fixed lens barrel 2 and the holder barrel 7. The fixed lens barrel 2 and the holder barrel 7 are fixed by a machine screw (not shown), and thus the fixed lens barrel 2, the holder barrel 7, and the frame portion 5a of the image blur compensation unit 5 are integrally constructed as a single unit.

As shown in FIGS. 1 and 3, a hollow coil 15 arranged in a substantially rectangular column shape is fixed to the fourth lens group holding frame 6. The coil 15 is provided on the side of the sleeve portion 6a through which a guide bar 10 of the fourth lens group holding frame 6 passes. The hollow portion (hole) of the coil 15 is formed along the optical axis. Yokes 16 and 17 and a magnet 18 fixedly held by the frame portion 5a of the image blur compensation unit 5 and the holder barrel 7 are provided between the frame portion 5a of the image blur compensation unit 5 and the holder barrel 7. The yoke 16 is formed into a square C-shape with one side open and extending along the optical axis, with the magnet 18 held therein. The yoke 16 is inserted into the hollow portion of the coil 15 described above, and the coil 15, the yoke 16, and the magnet 18 are spaced apart from one another by a predetermined distance. The magnet 18 is magnetized in a direction orthogonal to the optical axis and extends along the optical axis. The yoke 17 is held by the yoke 16 on the side of the distal ends on the opened side of the square C-shape. An actuator (driving actuator) 100 as a voice coil motor is constructed of the above-described coil 15, the yokes 16 and 17, and the magnet 18. When the coil 15 is energized, the fourth lens group holding frame 6 is driven in a direction of the optical axis by the magnetic action of a circuit formed by the yokes 16, 17 and the magnet 18 held by the image blur compensation unit 5 and the holder barrel 7. An encoder magnet 19 having opposite magnetic poles arranged alternately at predetermined pitches in the direction of the optical axis is held by the fourth lens group holding frame 6 on the side surface of the sleeve portion 6a through which the guide bar 10 is to be inserted, as shown in FIG. 3. At a position opposing the encoder magnet 19, there is provided an MR sensor 20 held by the holder barrel 7, and the encoder magnet 19 and the MR sensor 20 are disposed a predetermined distance apart, sufficient for detecting variations of magnetic poles.

The initial position of the fourth lens group holding frame 6 is determined in a state in which the fourth lens group holding frame 6 abuts against the image surface side (CCD 21 side) of the holder lens barrel 7, and thereafter, positional detection and drive control of the fourth lens group holding frame 6 are performed based on output signals supplied from the MR sensor 20 in accordance with magnetic variations (or variations in intensity of magnetism) acting on the MR sensor 20 in association with movement of the encoder magnet 19 held by the fourth lens group holding frame 6 in position with respect to the MR sensor 20. The MR sensor 20 outputs two-phase sinusoidal waves having a phase difference of 90 degrees, and the amount and direction of movement of the encoder magnet 19 (that is, the fourth lens group holding frame 6) can be determined from such two-phase outputs. Alternatively, the output of the MR sensor may be three-phase or more. Also, the phase difference may be an angle other than 90 degrees.

The construction of the image blur compensation unit 5 shown in FIG. 1 will be described referring to FIG. 4 and FIG. 5.

Figure 4:
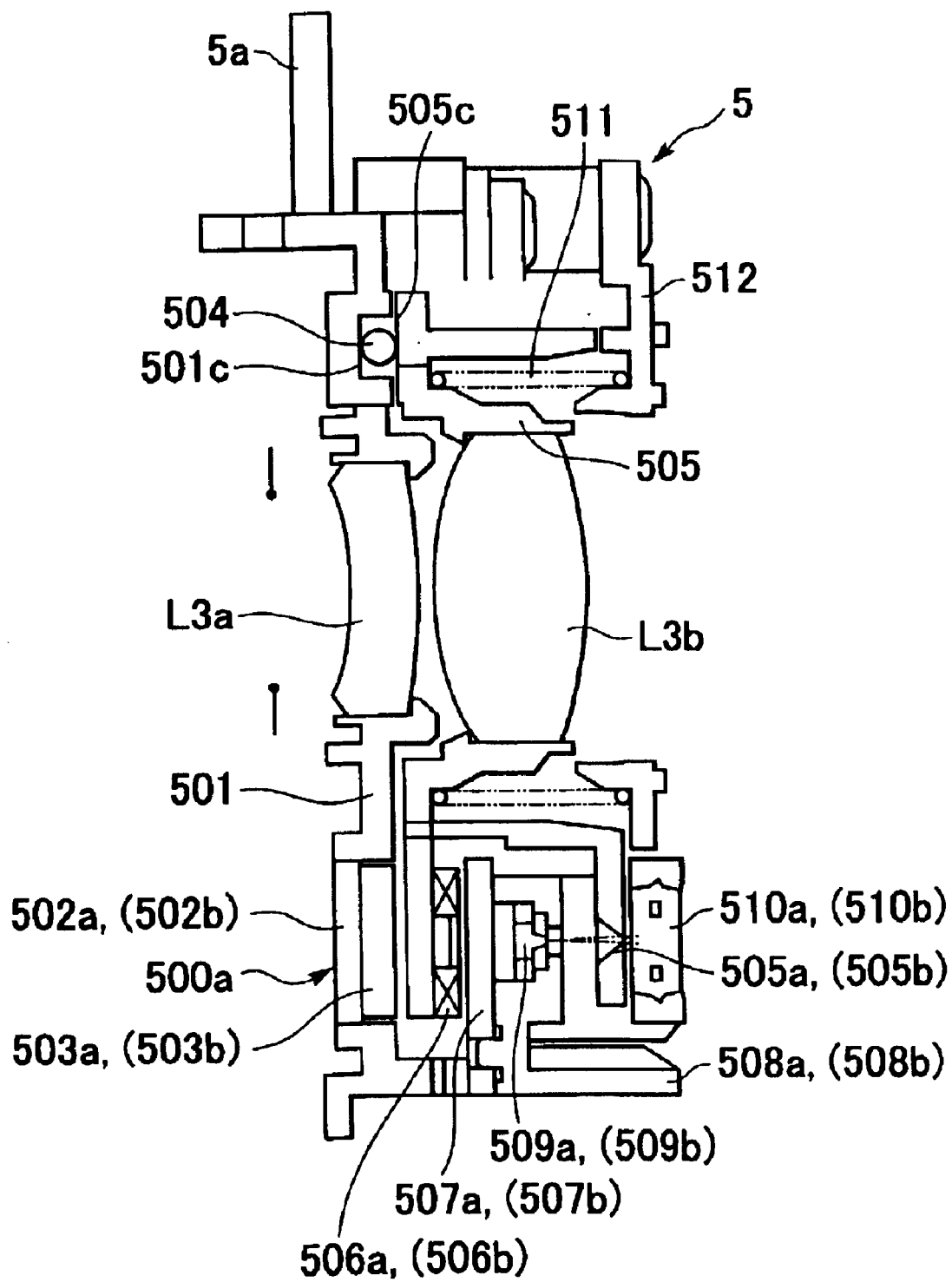
FIG. 4 is a cross-sectional side view showing an image blur compensation unit of the device of FIG. 1.
Figure 5:
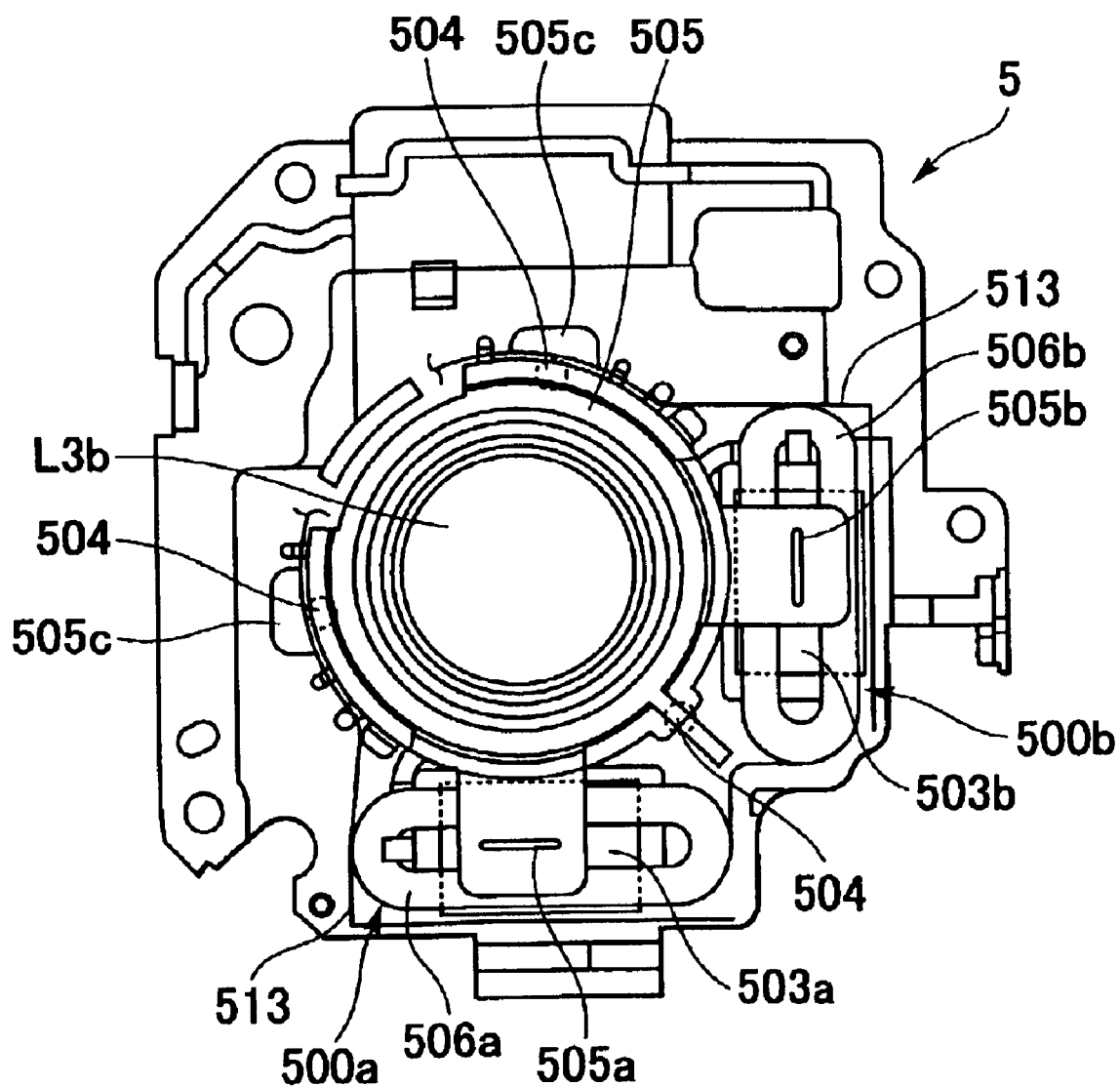
FIG. 5 is a view of the unit of FIG. 4 from the image surface side (image blur compensation lens L3b side).

FIG. 4 is a cross-sectional side view showing the image blur compensation unit 5, and FIG. 5 illustrates the image blur compensation unit of FIG. 4 when viewed from the image surface side (image blur compensation lens L3b side). In FIG. 4, only a blur compensation actuator 500a that drives a movable frame holding member 505 in the vertical direction orthogonal to the optical axis is shown; a blur compensation actuator 500b for driving the movable frame (holding member) 505 in the horizontal direction orthogonal to the optical axis (see FIG. 3) is substantially similar in structure and function, and therefore is not shown for ease of viewing. In FIG. 5, both the blur compensation actuator 500a that drives the movable frame 505 in the vertical direction orthogonal to the optical axis, and the blur compensation actuator 500b for driving the movable frame 505 in the horizontal direction orthogonal to the optical axis are shown. The blur compensation actuator 500a and the blur compensation actuator 500b are disposed so as to be orthogonal with respect to each other. In the following description, members constituting the vertical blur compensation actuator 500a are represented by reference numerals including a suffix "a", and members constituting the horizontal blur compensation actuator 500b are represented by reference numerals including a suffix "b". Although components of the horizontal blur compensation actuator 500b are not shown in FIG. 4, since they are structurally and functionally the same as like components of the vertical blur compensation actuator 500a, those components are represented with the suffix "b".

As shown in the drawings, a fixed frame 501 fixedly holds the fixed lens group L3a of a third afocal lens group. A movable frame 505 holds an image blur compensation lens group L3b of the third afocal lens group. Upper yoke members 507a and 507b are fixed to the fixed frame 501 together with sensor holding members 508a and 508b with machine screws (not shown).

A coil spring 511 held by a spring holding ring 512 fixed to the sensor holding members 508a and 508b with a machine screw urges movable frame 505 toward the fixed frame 501, and is capable of moving freely in a direction orthogonal to the optical axis by disposing steel balls 504 between three flat portions 505c on the fixed frame 501 and three flat portions 505c formed on the movable frame 505, respectively. The movable frame 505 is fixed with coils 506a and 506b, which are used for driving movement in the vertical direction and in the horizontal direction, respectively. Magnets 503a, 503b are magnetized with two poles. The magnets 503a and 503b are attracted to lower yokes 502a and 502b formed of a material such as iron. The lower yokes 502a and 502b are fixedly held on the shoulder (not shown) of the fixed frame 501 by a magnetic force attraction between the upper yoke members 507a and 507b and the magnets 503a and 503b. In this arrangement, a magnetic circuit for vertical and horizontal movement is formed. Specifically, for vertical movement, a magnetic circuit is formed by magnet 503a, lower yoke 502a and upper yoke member 507, and the coil 506a is inserted into a space among them. On the other hand, for horizontal movement, the magnetic circuit is formed by the magnet 503b, the lower yoke 502b and the upper yoke member 507, and the coil 506b is inserted into a space among them. In this manner, two electromagnetic actuators employing a moving coil system (blur compensation actuators 500a and 500b for compensating for image blur) for the vertical and horizontal movements are provided.

Light emitting elements 509a, 509b, such as IREDs, and corresponding light receiving elements 510a, 510b, such as PSDs, together constitute position sensors for the blur compensation lens. The light emitting elements 509a, 509b and the light receiving elements 510a, 510b are fixedly bonded to the sensor holding members 508a and 508b, respectively.

When the movable frame 505 formed with slits 505a and 505b, each in the shape of an elongated hole being formed integrally therewith, are inserted between the light emitting elements 509a, 509b and light receiving elements 510a, 501b, only a portion of infrared light emitted from the light emitting elements 509a and 509b that passes through the slits 505a and 505b is received by the light receiving elements 510a and 510b, which enables detection of vertical and horizontal positions of the movable frame 505. The light emitting elements 509a and 509b, the light receiving elements 510a and 510b, and the coils 506a and 506b are connected to a flexible printed board 513 (See, FIG. 5), and are connected to a microcomputer (not shown) in the camera unit (see, FIG. 1).

In this embodiment, as shown in FIGS. 1, 3 and 5, the coil 15, the yoke 16, the yoke 17 and the magnet 18 constituting the magnetic circuit (driving actuator 100) for driving the fourth lens group movable frame 6 holding the above-described focus lens group L4 are disposed at almost the same distance from the optical axis, and are symmetric to one of the two image blur compensation magnetic actuators (blur compensation actuators 500a and 500b) with respect to the optical axis when viewing the coil 506a, the lower yoke 502a and driving magnet 503a constituting the magnetic circuit (blur compensation actuator 500a) for vertical movement of the image blur compensation unit 5 and the coil 506b, the lower yoke 502b and the drive magnet 503b constituting the magnetic circuit (blur compensation actuator 500b) for horizontal movement of the image blur compensation unit 5 in the direction of the optical axis. Accordingly, as shown in FIG. 1, the position for disposing the driving actuator 100 constructed of the coil 15, the yoke 16, the yoke 17 and the magnet 18 for moving the focus lens group L4 is a space in which the two actuators 500a and 500b of the image blur compensation unit 5 are not disposed, and thus the length of the yoke 16, the yoke 17 and the magnet 18 in the direction of the optical axis may be increased, whereby a wide range of movement is ensured for coil 15 (focus lens group L4).

The magnetic circuits (driving actuator 100 and the two blur compensation actuators 500a and 500b) are disposed between an aperture unit 4 and the CCD 21 that corresponds to an imaging element, respectively.

Therefore, in the embodiment described above, the two blur compensation actuators 500a and 500b for driving the blur compensation lens in a direction orthogonal to the optical axis and the actuator 100 for driving the movable lens (focus lens) L4 in the direction of the optical axis efficiently may be disposed in a space of the lens barrel, thereby reducing a size of the lens barrel, shortening the length of the lens barrel in the direction of the optical axis, and effectively and securely increasing the range of movement of the movable lens L4 in the direction of the optical axis.

By disposing the coil 15, the yoke 16, the yoke 17 and the magnet 18 constituting the magnetic circuit (driving actuator 100) for driving the fourth lens group movable frame 6 holding the focus lens group L4 on the side (in the vicinity) of the sleeve portion 6a of the fourth lens group movable frame 6, or by disposing the magnetic actuator in the vicinity of the center of gravity of the movable lens group L4, a torque generated by the actuator (driving force) may be effectively utilized so that high-efficiency drive is achieved. In addition, since the encoder magnet 19 for detecting the position of the focus lens group L4 is disposed on the side surface of the sleeve portion 6a of the fourth lens group movable frame 6 and the MR sensor 20 is disposed so as to oppose the encoder magnet 19, the encoder magnet 19 is positioned in the vicinity of the point of action of drive, and thus the position of the movable lens (focus lens) L4 in the direction of the optical axis may be detected with a high degree of accuracy.

Although a construction in which a magnetic sensor using an encoder magnet 19 and an MR sensor 20 is employed as a sensor for detecting the position of the focus lens L4 in the embodiment described above, an optical sensor alternatively may be used. In this case, a reflecting member formed with a grid of a predetermined cycle is provided on the side of the movable frame holding the focus lens, and an optical sensor is disposed on the side of the fixed lens barrel opposing the reflecting member. In this arrangement, the optical sensor emits light toward the reflecting member, receives light reflected therefrom, and outputs two-phase sinusoidal waves having a phase difference of 90 degrees, as in the case of the above-described MR sensor 20.

As described thus far, according to the embodiment described above, the two blur compensation actuators for driving the blur compensation lens in a direction orthogonal to the optical axis, and the actuator for driving the movable lens in the direction of the optical axis efficiently may be disposed in a space of the optical system, thereby reducing the size of the lens barrel, shortening the length of the lens barrel in the direction of the optical axis, and efficiently and securely increasing the range of movement of the movable lens in the direction of the optical axis. Furthermore, the position of the movable lens in the direction of the optical axis may be detected with a high degree of accuracy.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A lens device comprising:

a blur compensation lens holding member holding a blur compensation lens;

two blur compensation actuators that drive the blur compensation lens holding member to move in a direction orthogonal to an optical axis of the lens device to compensate for image blur;

a movable lens holding member holding a movable lens; and an axial driving actuator that drives the movable lens holding member to move in the direction of the optical axis, the axial driving actuator including a magnet magnetized vertically in the direction of the optical axis, a yoke, and a coil mounted on the movable lens holding member at a predetermined distance from the magnet, said coil being movable relative to the magnet in the direction of the optical axis by application of current in the direction orthogonal to a magnetic flux generated by the magnet, said driving actuator being disposed at a position symmetrical to one of the two blur compensation actuators with respect to the optical axis when viewed in the direction of the optical axis.

2. A lens device according to claim 1, wherein the movable lens is a focus lens.

3. Optical equipment comprising:

(a) an optical system comprising:

(i) a blur compensation lens holding member holding a blur compensation lens;

(ii) two blur compensation actuators that drive the blur compensation lens holding member to move in a direction orthogonal to an optical axis of the optical system to compensate for image blur;

(iii) a movable lens holding member holding a movable lens; and (iv) an axial driving actuator that drives the movable lens holding member to move in the direction of the optical axis, the axial driving actuator including a magnet magnetized vertically in the direction of the optical axis, a yoke, and a coil mounted on the movable lens holding member at a predetermined distance from the magnet, said coil being movable relative to the magnet in the direction of the optical axis by application of current in the direction orthogonal to a magnetic flux generated by the magnet, said driving actuator being disposed at a position symmetrical to one of said two blur compensation actuators with respect to the optical axis when viewed in the direction of the optical axis;

(b) a light amount adjusting member that adjusts the amount of light passing through the optical system; and (c) an imaging element that images an optical image from the optical system.

4. The optical equipment according to claim 3, wherein said one of said two blur compensation actuators and said driving actuator are provided between the light amount adjusting member and the imaging element.

5. The optical equipment according to claim 3, wherein the movable lens is a focus lens.

* * * * *